S. HOFFER.
Seed Planter.
No. 1,245.
Patented July 17, 1839.
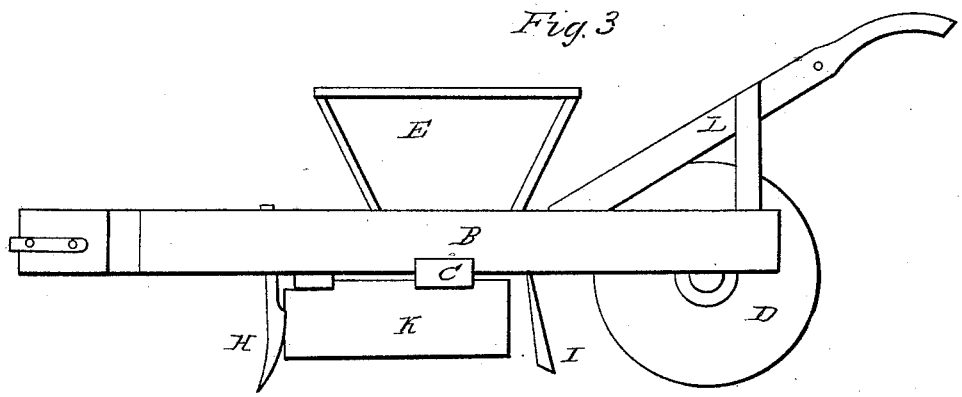
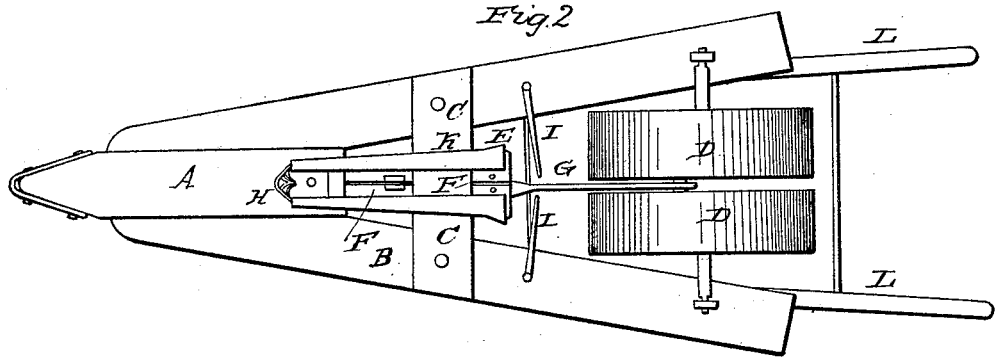
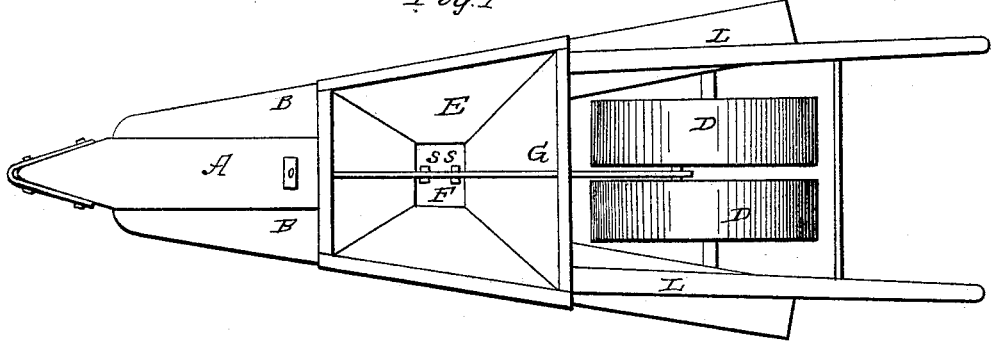
INVENTOR
Sam Hoffer

UNITED STATES PATENT OFFICE.

SAMUEL HOFFER, OF LONDONDERRY, PENNSYLVANIA.

IMPROVEMENT IN MACHINES FOR SOWING GRAIN AND PLASTER, &c.

Specification forming part of Letters Patent No. 1,245, dated July 17, 1839.

*To all whom it may concern:*

Be it known that I, SAMUEL HOFFER, of Londonderry, in the county of Dauphin and State of Pennsylvania, have invented a new and useful Improvement in Agriculture, called a "Roller Corn-Planting Plow;" and I do hereby declare that the following is a full and exact description.

A piece of scantling of about four inches square and about eighteen inches in length is shaped at one end in a proper manner to receive a clevis by which the plow is drawn. This is called the "center piece," A. Two other pieces of the same scantling, about three feet long and dressed, one end of each slopingly extending about one foot from the end, and place these pieces one on each side of the first-described piece, with the sloping side next it, and fasten them firmly with bolts extending through them. These are called the "side pieces," B, and by means of the slope the width between them at the hind end will be about eighteen inches. Another piece of wood, about three inches broad and half that thickness, is dovetailed into and across the lower side of the side pieces, about the middle thereof, which is called the "cross-bar" C. Immediately above this piece is placed a hopper, E, with a division extending from front to rear, and a lid with hinges covering it. A moving bottom or slide board, F, is made to fit between the hopper and the cross-bar, with two holes near the division on each side, of sufficient size to hold as many grains of corn or as much gypsum or ashes as you wish to have dropped at once. These holes are wider below than above to prevent the grains from wedging fast.

Two wooden rollers are made of about eighteen inches in diameter and of about eight or nine inches in length each, D. They are placed in a square iron axis with a crank in the middle which would describe a circle of about four inches. The rollers approach within an inch of each other, and each end of this axis is made round, so as to turn with ease in a hole made in pieces of iron for that purpose. These irons are made to pass up through the hind end of the side pieces and fastened with a nut on top. A rod of iron, G, is made to fit on the crank, and passing between the rollers, the other end is made fast to the slide-board. At every round of these rollers two droppings of corn are made, to wit: one by shoving the front hole of the slide-board in front of the cross-bar and the other by drawing the other hole in rear of the cross-bar. Thus corn may be dropped from one side of the hopper and gypsum or ashes from the other.

A shovel in the common form of those used in what is called the "shovel-plow," H, is placed through and near the hind end of the center piece, and fastened on top by a nut. About half-way between the cross-bar and rollers a piece of iron of about six inches broad at the lower end and brought to a square at the upper end is driven through each side-piece from the lower side, and fastened on the top by a nut. These are called the "scrapers," I. Two pieces of sheet-iron are fastened on the lower side of the cross-bar and extend some distance both in front and rear of the cross-bar, and incline toward each other. These are called the "fenders" K. When the plow is drawn forward the shovel makes sufficient furrow to receive the grain and the fenders direct the grain properly into the furrow, the scrapers cover it, and the roller smoothing it after them. Two handles of convenient length, L, are let into the side pieces immediately behind the hopper, and are supported by a brace from the hind end of the side pieces up to the handle. The holes in the slide-board are represented by the letter $s$.

No. 1, top view; No. 2, bottom view; No. 3, side view.

What I claim as my invention, and desire to secure by Letters Patent, is—

1. The construction of the hopper E in two parts by means of a vertical division passing through the middle of it, in combination with the moving bottom or slide-board F, worked by a crank attached to the roller D, which sliding bottom conveys the corn and gypsum from each division of the hopper and permits it to fall into the same furrow together, the whole operating in the manner and for the purposes herein described.

2. In combination with the above, the fenders K for directing the seed into the furrows, as herein described.

SAM. HOFFER.

Witnesses:
SAM. DALE,
LEAH L. DALE.